Dec. 7, 1965    J. B. DICKSON    3,222,512
MOTOR VEHICLE CLEARANCE AND MARKER LAMPS WITH SHOCK ISOLATION
Original Filed March 16, 1961    2 Sheets-Sheet 1
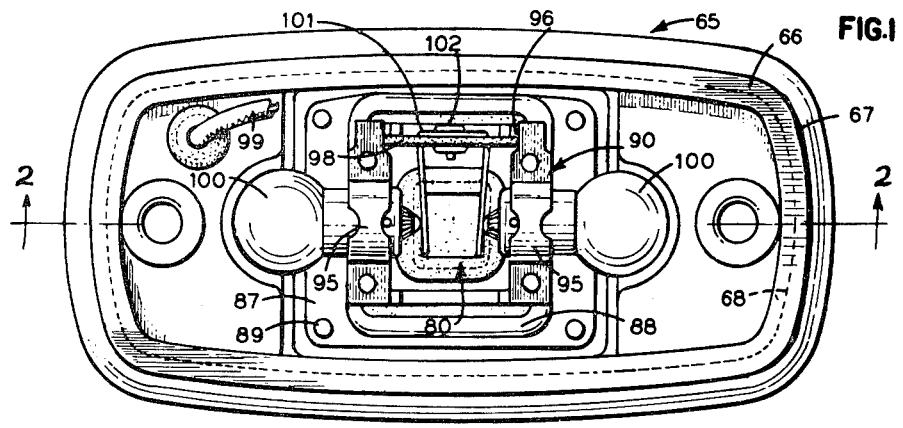
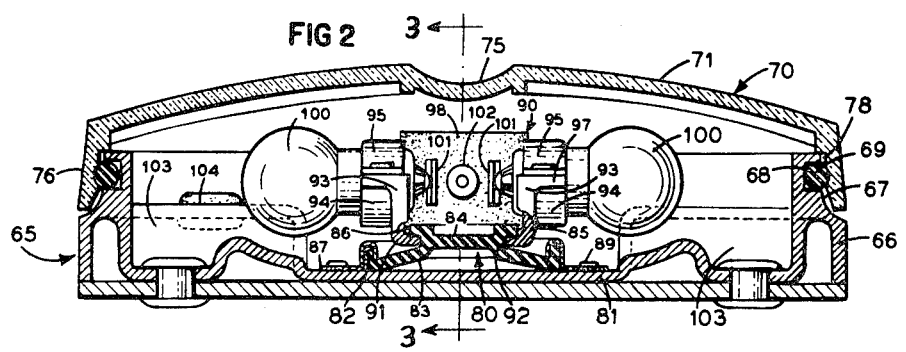
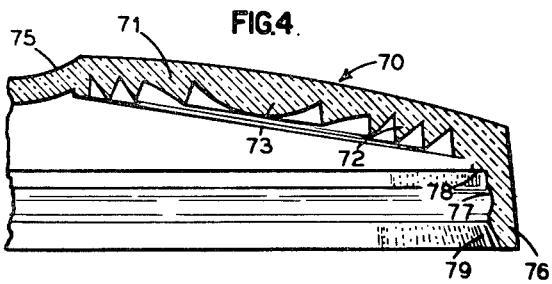
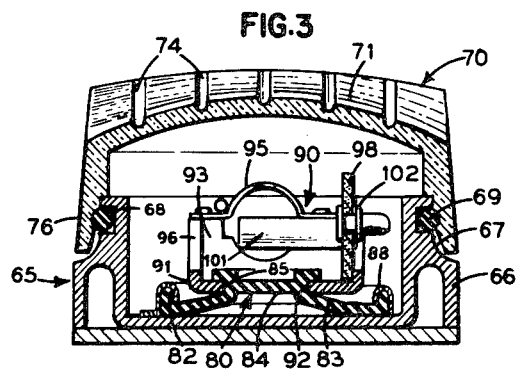

Dec. 7, 1965   J. B. DICKSON   3,222,512
MOTOR VEHICLE CLEARANCE AND MARKER LAMPS WITH SHOCK ISOLATION
Original Filed March 16, 1961   2 Sheets-Sheet 2

_United States Patent Office_     3,222,512
Patented Dec. 7, 1965

3,222,512
MOTOR VEHICLE CLEARANCE AND MARKER
LAMPS WITH SHOCK ISOLATION
John B. Dickson, Kew Gardens, N.Y., assignor to Lehigh
Valley Industries, Inc., New York, N.Y., a corporation
of Delaware
Original application Mar. 16, 1961, Ser. No. 96,181, now
Patent No. 3,145,933, dated Aug. 25, 1964. Divided
and this application Dec. 27, 1963, Ser. No. 333,931
13 Claims. (Cl. 240—8.2)

This invention relates to clearance and marker lamps for commercial automotive vehicles, such as buses and trucks, and more particularly to lamps of this type incorporating novel shock isolating means for the lamp bulb and its socket and novel means whereby lenses may be readily removed for access to the lamp bulb or bulbs. This application is a division of my copending application Serial No. 96,181, filed March 16, 1961 and now Patent No. 3,145,933.

Commercial automative vehicles, such as buses, trucks, trailers and the like, are required by law or by Interstate Commerce Commission regulations, to carry or be provided with certain specified lamps of the clearance or marker type. Such lamps are designed to be mounted on the front and rear ends of the vehicle, and also on the sides of the vehicle.

As hitherto constructed, such lamps have had certain disadvantageous features. For example, due to the road shocks to which a commercial vehicle is continuously subjected, the filaments in the lamp bulbs have been broken at a relatively high rate. This necessitates that the lamp bulbs be replaced at frequent intervals, and very often this happens when the vehicle is on a run. Unless the driver has been supplied with certain special tools for removing lenses and the like, it is difficult, if not impossible, for him to replace a broken lamp bulb during a run.

In accordance with the present invention, novel lamp constructions are provided in which not only may the lenses be relatively easily removed for access to a lamp bulb or lamp bulbs in the lamp housing, but also novel shock absorbing means are interposed between each lamp bulb socket and a relatively fixed part of the housing so that the lamp bulb and its socket are isolated from road shocks received by the vehicle. Consequently, the life of lamp bulbs in lamps embodying the principles of the present invention is an indefinite multiple of the life of lamp bulbs in known types of marker and clearance lamps.

Stated as a general principle, the shock isolating mounts of the lamps of the present invention operate in a cantilever fashion. They are formed of relatively soft rubber elements, which have somewhat the configuration of nipples, with the base of the nipple being secured to the housing of the lamp and the support for the lamp bulb sockets being mounted on the upper ends of the nipples and spaced substantially from the base thereof. Due to the relatively soft nature of the rubber or rubber-like material used in making the shock mountings, this material has a resiliency and "give" which allows shocks to be absorbed without being transmitted to the lamp socket or the lamp therein.

For an understanding of the principles of the invention, reference is made to the following description of typical embodiments thereof as illustrated in the accompanying drawings. In the drawings:

FIG. 1 is a plan view, with the lens removed, of a clearance or marker lamp embodying the invention;

FIG. 2 is a sectional view on the line 2—2 of FIG. 1;

FIG. 3 is a sectional view taken on the line 3—3 of FIG. 2;

FIG. 4 is an enlarged partial sectional view through the lens, illustrating details of its refracting surfaces;

Figure 5:
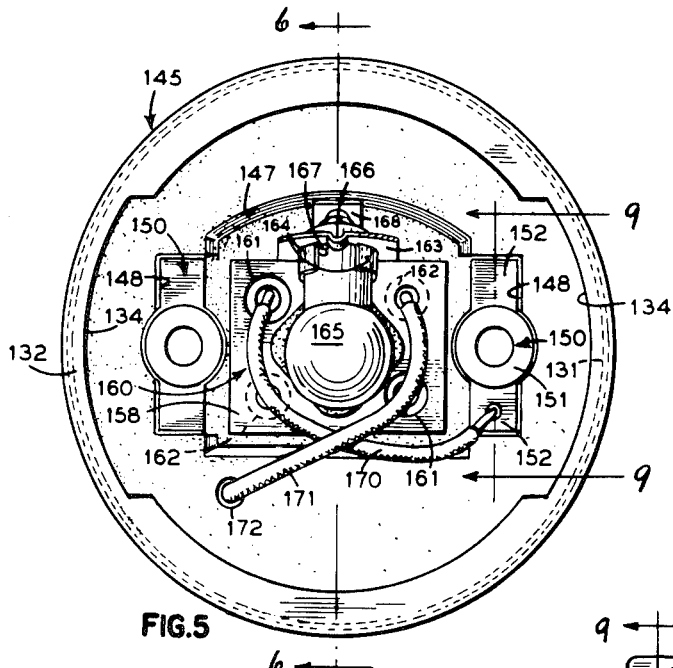
FIG. 5 is a plan view, with the lens removed, of another form of marker or clearance lamp embodying the invention.

Referring to FIGS. 1 through 4, the lamp therein illustrated has a shock isolating mounting for the socket assembly which is essentially similar, in principle, to that of the lamp of FIGS. 1, 2 and 3 of my said copending application. The lamp shown in FIGS. 1 through 4 is arranged to have two lamp bulbs mounted therein but preferably connected in a common energizing circuit.

The lamp includes a base 65 which is substantially oval in plan and has a peripheral wall 66 which is relatively thick laterally but hollowed out to reduce weight. The upper portion of rim 66 has an outwardly and upwardly opening substantially arcuate recess 67 extending therearound and, near the upper edge of rim 66, a substantially rectangular groove 68 extends inwardly from arcuate recess 67. Recess 68 receives a gasket 69 of suitable flexible and resilient material and which has a circular cross section. Gasket 69 extends somewhat outwardly of recess 68 to project slightly beyond the surface of arcuate recess 67.

Gasket 69 serves as a retainer for a lens 70 for the lamp. This lens 70, which is molded from a suitable transparent or translucent plastic composition material of any desired color, includes a generally arched outer wall 71 having its inner surface formed, as best seen in FIG. 4, with suitable ribs 72, substantially saw toothed in form, and ribs 73 substantially arcuate in form serving to impart the desired optical properties to lens 70. Wall 71 also has an arcuate depression 75 extending transversely thereof intermediate its ends, and the outer surface of wall 71 has grooves 74 extending longitudinally from the recess 75 to each end of the lens.

Lens 70 has a side wall or rim 76 extending downwardly from wall 71 and forming a peripheral wall of the lens. Wall 76 slopes somewhat outwardly and has a substantially flat outer surface. The inner surface of wall 76 is formed with a shallow arcuate recess 77 outwardly of which is a shoulder 78. Inwardly of recess 77, the inner surface of wall 76 slopes outwardly at a relatively sharp angle as indicated at 79. Lens 70 is assembled by forcing it downwardly over the wall 66 until the gasket 69 engages in the recess 77, at which point the shoulder 78 will be substantially at the upper surface of rim 66 of base 65. The sloping surface 79 provides appropriate clearance with the arcuate surface 67.

The bottom wall 81 of base 65 has a substantially flat central outer surface portion on which is mounted the shock isolating assembly generally indicated at 80. This shock isolating member is a generally flat piece of soft rubber which is rectangular in plan and has an upturned peripheral rim 82 on a substantially flat marginal portion engaging base 65. Inwardly of rim 82, the base of shock mount 80 slopes upwardly at a very small acute angle, as indicated at 83, with the inner edges of the upwardly sloping portion 83 merging with a relatively short reduced neck 85 having a substantially horizontal inner surface or membrane 84. Nipple 85 has a relatively short outturned lip or flange 86 at its upper end.

Shock mount 80 is retained in position by a retainer plate 87 having a central opening receiving the mounting and provided with an inturned rib 88 extending over the shoulder or rim 82 of the shock mount. Rivets 89 secure metal retaining plate 87 to the base wall 81.

A dual socket assembly is generally indicated at 90 and comprises a metal socket or contact member which is generally U-shape or channel shape in elevation and includes a base 91 having a central square opening 92 arranged to closely fit the nipple 85 of shock mount 80. Shock mount 80 is engaged in this central opening 92 by means of the lip 86 being pressed inwardly until it snaps through the opening and engages thereover with the base 91 resting on the upper edges of the sloping portions 83 of shock mounting 80. End walls or flanges 93 extend from either longitudinally opposite end of member 91 and have arcuate semicylindrical recesses in their upper edges continued as semicylindrical extension 94 each forming one-half of a lamp socket. End walls 93 have inturned flanges 96 at each end, and horizontal flanges 97 extend outwardly from either side of the half sockets 94. Mating half socket elements or clamps 95, are riveted to the flanges 97 to complete the pair of lamp sockets or sleeve formations arranged to receive the bases of bayonet type lamp bulbs 100.

One pair of inturned ends 96 of the end walls 93 serves to position a dielectric member or insulating plate 98 having a pair of spaced slots through which extend the elongated arms of a U-shape contact member 101, of phosphor bronze or the like, having its base riveted to plate 98 by an eyelet type rivet 102. The arms of contact 101 are engaged by the central base contacts of lamps 100.

Adjacent its outer end, base 65 has elevated portions 103 which define arcuate recesses having peripheral surface portions spaced slightly from the bulbs 100, and one of these raised portions 103 is apertured to receive a grommet 104 through which extends an insulated conductor 99 arranged to have its end bared and soldered or brazed to one of the straps 95 to form one terminal of the lamp circuit. A similar insulated conductor (not shown) has an end bared and soldered or brazed to the contact strip 101. Alternatively, conductor 99 may be connected to contact strip 101 and a short conductor may be soldered to brazed to a strap 95 and to base 65, the short conductor providing a grounding connection for the lamps.

It will be noted that the entire socket assembly is cushioned by the shock mount 80 and thereby isolated from any transmission of road shocks thereto, thus resulting in a greatly increased life of the lamp bulbs 100.

Figure 6:
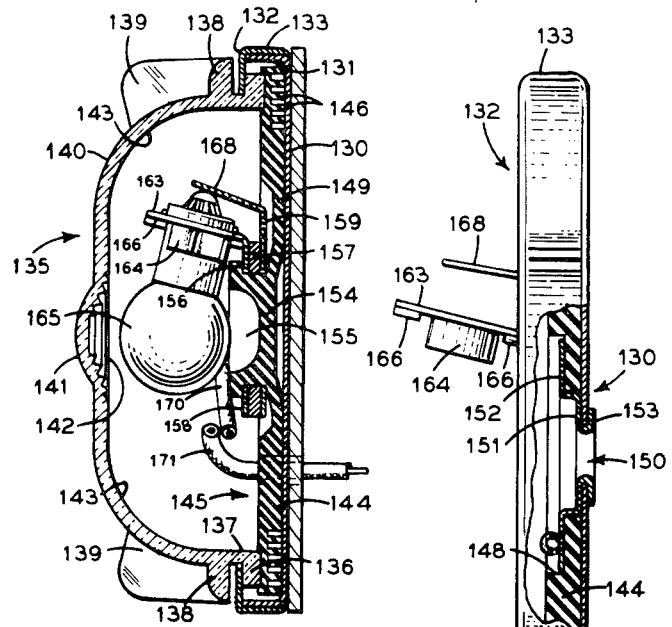
FIG. 6 is a diametric sectional view of the lamp shown in FIG. 5, taken on the line 6—6 thereof.
Figure 7:
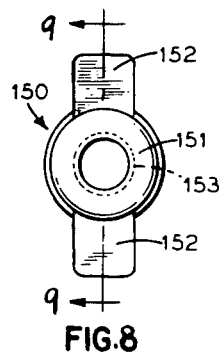
FIG. 7 is an elevational view, partly in section, of the lamp shown in FIG. 5.
Figure 8:
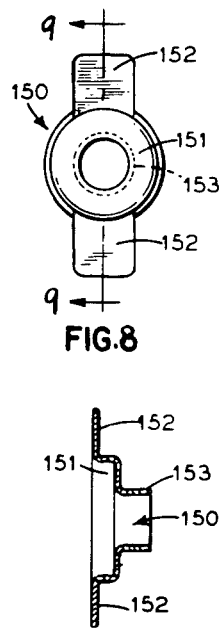
FIG. 8 is a plan view of a portion of the lamp shown in FIG. 5.
Figure 9:
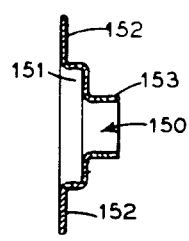
FIG. 9 is a sectional view taken on the line 9—9 of FIGS. 8 and 5.

In the embodiment of the invention shown in FIGS. 5 through 9, the lamp includes a housing comprising a substantially circular base 130 having an upstanding peripheral flange 131 and a mating circular retainer 132 having a peripheral flange 133 overlapping and tightly engaging the flange 131. Flange 133 has a pair of diametrically opposite cutouts or notches 134 of substantial arcuate extent.

The cutouts 134 are arranged to receive lips 136 on the cylindrical wall 137 of a lens 135. At a level spaced outwardly from the lips 136, lens 135 is formed with a flange extending completely therearound and overlying the flange 132 of the retainer. The lens 135 is placed in position by moving the lips 136 into the cutouts 134 and then turning the lens until the lips 136 engage beneath the retainer 132. Such turning is facilitated by a pair of diametrically opposite radial wings 139 extending from the lens 135 and merging with the peripheral flange 138.

The main concavo-convex outer portion 140 of lens 135 is provided with a "bull's eye" 141 whose inner surface has a series of concentric grooves 142 extending parallel to the wings 139. Inwardly of the "bull's eye," the surface of portion 140 is formed with a plurality of radial ribs 143.

In this modification of the invention, the shock isolating mounting, generally indicated at 145, includes a circular disk 144 having a diameter just slightly less than the inner diameter of flange 131 of base 130, and formed of soft rubber. Adjacent the periphery of disk 144, its inner surface is formed with a plurality of grooves extending circumferentially thereof and radially spaced slightly therefrom to provide a plurality of relatively thin ribs 146. This increases the yieldability of disk 144 at the portion engaged by the ears 136 of lens 135, the disk 144 acting as a sealing gasket for the lens and forcing the ears 136 outwardly against retainer 132. The central portion of the upper surfaces of disk 144 is recessed to thin the material of the disk, as indicated at 147, this recess having one straight edge opposite an arcuate edge, and having two extension recesses 148. These extension recesses receive anchoring members 150 (FIGS. 8 and 9) each comprising a recessed annular central part 151 and a pair of diametrically extending ears 152. The central parts 151 are in the nature of eyelets and are axially extended to fit through openings in base 130, being turned over underneath the base, as indicated at 153. Thereby, there are formed eyelet rivet arrangements securing the shock mounting 145 to the base 130 and arranged to receive bolts or screws for securing the lamp to the surface of a vehicle.

Centrally of the recess 147, the thin portion 149 of disk 144 is offset upwardly away from the base 130, as indicated at 154. A short neck 155 extends upwardly from part 154 and has a short outturned lip 156 on its outer end. Nipple 155 resiliently supports the socket assembly indicated generally at 160.

The socket assembly 160 includes a substantially square insulating plate 157 of dielectric material, an essentially square contact plate 158, and an essentially square contact plate 159. Contact plate 158 has a pair of diagonally opposite relatively large apertures 162 therein, the apertures 161 and 162 alternating around the square formation of the socket assembly. Plate 158 is riveted to insulator plate 157 by relatively small eyelet rivets coaxially of the apertures 162 in contact plate 159. Similarly, plate 159 is riveted to insulator plate 157 by relatively small eyelet rivets arranged coaxially of the apertures 161. Thereby plate 158 and plate 159 are effectively electrically isolated from each other.

Plate 158 has an extension 163 bent upwardly at an angle from one edge thereof and formed with a circular aperture for receiving the base of a bayonet type lamp bulb 165. A pair of diametrically opposite arcuate wings 164 extend outwardly from extension 163, forming a sleeve formation peripherally bounding the opening in the extension 163. Intermediate the wings 164, extension 163 is formed with a pair of diametrically opposite offsets 166, and between each offset 166 and an adjacent wing 164, the periphery of the opening is formed with a short notch 167. Contact plate 159 is formed with an extension arm 168 extending upwardly and outwardly in somewhat spaced relation to the extension 163 of plate 158. Thereby lamp bulb 165 may be inserted by having its pins extended through the notches 167, and then be turned until the pins engage in the offsets 166. At this time, the center contact of the lamp bulb will engage the spring extension 168 so that the lamp bulb will be retained mounted in the socket assembly.

The socket assembly is supported on the nipple 155 by engaging the same over the nipple until the lip 156 overlies plate 158 with plate 159 engaging the sloping portion of thin part 149 of disk 144. A short insulated conductor 170 has one bared end soldered to one clamp 150 and the other bared end soldered to a rivet securing contact plate 159 to insulator plate 157. Thus, plate 159 is effectively grounded. A second insulated conductor 171 has one bare end soldered to a rivet securing plate 158 to insulator plate 157. Conductor 171 extends through an opening 172 in disk 144 of shock mounting 145, this opening being aligned with a corresponding opening in base 130 so that the conductor 171 may be led to a suitable energizing circuit for the lamp.

It will be noted that the socket assembly 160 is supported in spaced relation to the base 130 by means of the shock isolating mounting 145, and particularly the nipple 155. Consequently, any road shocks received by the vehicle are effectively isolated from the socket assembly so that the lamp 165 has a life many times that of a lamp bulb not similarly mounted.

While specific embodiments of the invention have been shown and described in detail to illustrate the application of the principles of the invention, it will be understood that the invention may be embodied otherwise without departing from such principles.

What is claimed is:

1. An automotive vehicle lamp comprising, in combination, a base having a substantially flat outer surface portion; a generally flat one-piece integral shock isolating mounting of relatively soft and flexible rubber-like material, having a substantially flat marginal portion engaging said substantially flat outer surface portion, and a substantially central hollow outwardly projecting nipple, of substantially rectangular lateral cross section, formed by walls sloping toward each other and at a very small acute angle to said marginal portion, and then extending substantially normal to said marginal portion to form a relatively short substantially rectangular neck, the outer end of the neck terminating in a relatively short laterally extending peripheral lip; and a lamp socket assembly including a relatively rigid support member having a substantially planar portion formed with a substantially rectangular aperture closely embracing said substantially rectangular neck for support solely by engagement with the outer portions of said sloping walls and retention thereon by said lip; said lamp socket assembly including lamp bulb retaining means and lamp bulb engaging contact means; whereby said lamp socket assembly is resiliently supported solely by said nipple and isolated thereby from shocks received by said base.

2. An automotive vehicle lamp, as claimed in claim 1, including means clamping said marginal portion of said shock isolating mounting to said base.

3. An automotive vehicle lamp, as claimed in claim 1, in which said marginal portion of said shock isolating mounting is substantially rectangular in plan.

4. An automotive vehicle lamp, as claimed in claim 1, in which said marginal portion of said shock isolating mounting is substantially circular in form.

5. An automotive vehicle lamp as claimed in claim 1 including a lens enclosing said lamp socket assembly and having a rim engaging the base marginal portion of said shock isolating mounting; and retaining means engaging said lens adjacent said rim and holding said lens in compressing relation with said base marginal portion and assembled to said lamp base; said marginal portion of said shock isolating mounting acting as a sealing gasket for said lens.

6. An automotive vehicle lamp comprising, in combination, a lamp base; a shock isolating mounting, of relatively soft and flexible rubber-like material, on said base and including a hollow outwardly projecting nipple formed with a relatively short reduced non-circular cross section neck at its outer end terminating in a relatively short laterally extending peripheral lip; a lamp socket assembly supported on said nipple and including a pair of metal contact members electrically insulated, and relatively fixedly spaced, from each other by a dielectric member; said socket assembly including at least one member having a substantially planar portion formed with a non-circular aperture closely embracing said reduced neck for support of said socket assembly by said nipple and retention on said nipple by said lip; one of said metal contact members including at least one sleeve formation to receive the base of a lamp bulb and make electrical contact with the lateral surface of such lamp bulb base; the other of said metal contact members including at least one spring finger engageable with the center contact of the base of a lamp bulb in said sleeve formation.

7. An automotive vehicle lamp, as claimed in claim 6, in which said one metal contact member is generally channel shape with its base constituting said substantially planar portion; each of the flanges of said one member being formed with semi-cylindrical recesses cooperable with semi-cylindrical clamps to form a sleeve formation, and the two sleeve formations being substantially axially aligned and oppositely directed; said dielectric member comprising a substantially flat plate positioned substantially perpendicular to the base of said one member and extending between the flanges thereof adjacent one end of the base; said other metal contact member comprising a U-shape spring member having its base secured to said dielectric member and its legs extending in substantially parallel spaced relation to the flanges of said one member to constitute a pair of spring fingers each engageable with the center contact of the base of a respective lamp bulb in a respective sleeve formation.

8. An automotive vehicle lamp, as claimed in claim 6, in which said dielectric member is a dielectric plate; said metal contact members being formed with substantially planar portions each superposed to a respective opposite face of said dielectric plate; said one metal contact member including a portion extending angularly from the planar portion thereof and having said sleeve formation; said other metal contact member including a portion extending angularly from the planar portion thereof and in spaced relation to the angularly extending portion of said one metal contact member; the angularly extending portion of said other metal contact member constituting said spring finger.

9. An automotive vehicle lamp, as claimed in claim 8, in which the planar portions of said metal contact member and said dielectric plate are formed with aligned apertures constituting said non-circular aperture closely embracing said reduced neck.

10. An automotive vehicle lamp comprising, in combination, a housing including a base having a substantially flat surface portion; a shock isolating mounting of relatively soft and flexible rubber-like material including a laterally extending base portion engaging said base surface portion, a hollow nipple extending upwardly from said base portion and having upwardly and inwardly converging side walls, a reduced non-circular neck extending from the upper ends of said side walls, and a lateral retaining lip at the upper end of said neck; means engaging said base surface portion and securing the same to the housing base; a substantially U-shaped lamp socket member including a relatively flat base having a non-circular aperture receiving said neck and fitted thereover by deformation of said lip, and supported solely by engagement with said sloping side walls; means, including the flanges of said U-shaped socket member, forming a pair of open ended bayonet type lamp sockets which are axially aligned and extend in opposed directions; a plate of dielectric material extending perpendicular to the base of said lamp socket member between the flanges thereof; and a U-shaped member of electrically conductive resilient material having a base secured to said dielectric plate and arms extending inwardly therefrom across said lamp socket means; said arms being engaged by the center contacts of the bases of lamps engaged in said lamp socket means.

11. An automotive vehicle lamp comprising, in combination, a housing including a substantially circular base having a substantially flat circular portion bounded by an upstanding peripheral rim; an annular retaining member having a downwardly extending flange embracing said peripheral rim and an inwardly extending flange extending inwardly over said peripheral rim; said inwardly extending flange having a pair of diametrically opposed arcuate recesses therein; a shock isolating mounting of relatively soft and flexible rubber-like material including a substantially circular base portion engaging the circular portion of said base within said peripheral rim, and a hollow nipple extending upwardly from said base portion and having upwardly and inwardly sloping side walls;

a lamp socket member formed with an aperture receiving the upper end of said nipple and supported solely by engagement with said sloping side walls in spaced relation to said base; an outwardly convex hollow lens including a cylindrical rim portion fitting within the inner periphery of said inwardly extending flange, said rim portion having a pair of diametrically opposed arcuate lips arranged to removably fit through said arcuate slots so that said lens may be turned to engage said lips beneath said inwardly extending flange to anchor said lens to said base; said lens, when so anchored, compressing the base of said shock isolating mounting so that the latter acts as a gasket for said lens.

12. An automotive vehicle lamp as claimed in claim 11 including a pair of vertically extending radial wings projecting from the convex portion of said lens to provide grips for twisting said lens for engagement and disengagement of the latter relative to said base.

13. An automotive vehicle lamp as claimed in claim 11 in which said lamp socket member comprises inner and outer metal plates separated by an intermediate dielectric plate and having said aperture formed therethrough, said inner plate having a flange bent upwardly therefrom and formed as an open ended bayonet type socket for a lamp bulb base; said outer metal plate having a flange bent upwardly therefrom in spaced relation to the flange on said inner conductive plate and forming a spring contact arranged to be engaged by the central base contact of a lamp bulb engaged in said socket.

References Cited by the Examiner
UNITED STATES PATENTS

| | | | |
|---|---|---|---|
| 2,685,639 | 8/1954 | Wiley | 240—8 |
| 2,686,868 | 8/1954 | Diedring | 339—93 X |
| 2,707,747 | 5/1955 | De Frees | 240—41 X |
| 2,782,298 | 2/1957 | Scholtz et al. | 240—41 X |
| 2,855,498 | 10/1958 | Knapp | 240—7 |
| 2,871,342 | 1/1959 | Mappes | 240—8 X |
| 2,876,340 | 3/1959 | Williams | 240—151 X |
| 2,985,750 | 5/1961 | Ritz-Woller et al. | 240—7 |
| 3,087,051 | 4/1963 | Black | 240—73 X |
| 3,093,320 | 6/1963 | Knapp | 240—8 |

FOREIGN PATENTS

| | | |
|---|---|---|
| 220,743 | 10/1958 | Australia. |
| 1,007,429 | 5/1957 | Germany. |

NORTON ANSHER, *Primary Examiner.*